Sept. 12, 1939.  M. P. WHITNEY ET AL  2,172,780
VARIABLE SPEED TRANSMISSION
Filed Jan. 3, 1938   2 Sheets-Sheet 1

Witness:
Burr W. Jones

INVENTOR.
Maurice P. Whitney
BY Youston Sekella
Clinton S. Janis.
ATTORNEY.

Sept. 12, 1939.                M. P. WHITNEY ET AL                2,172,780
                          VARIABLE SPEED TRANSMISSION
                          Filed Jan. 3, 1938          2 Sheets-Sheet 2
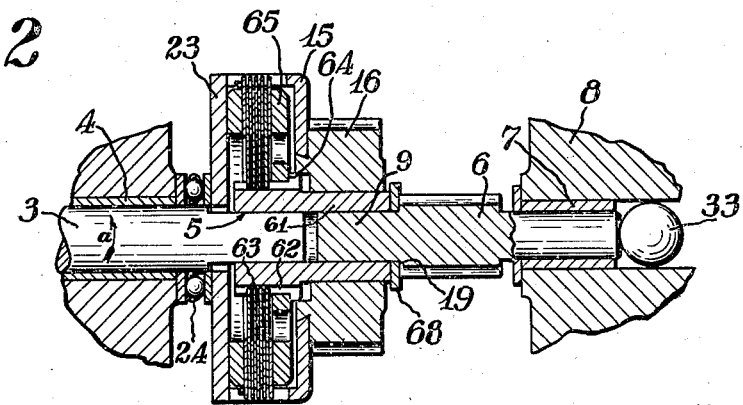
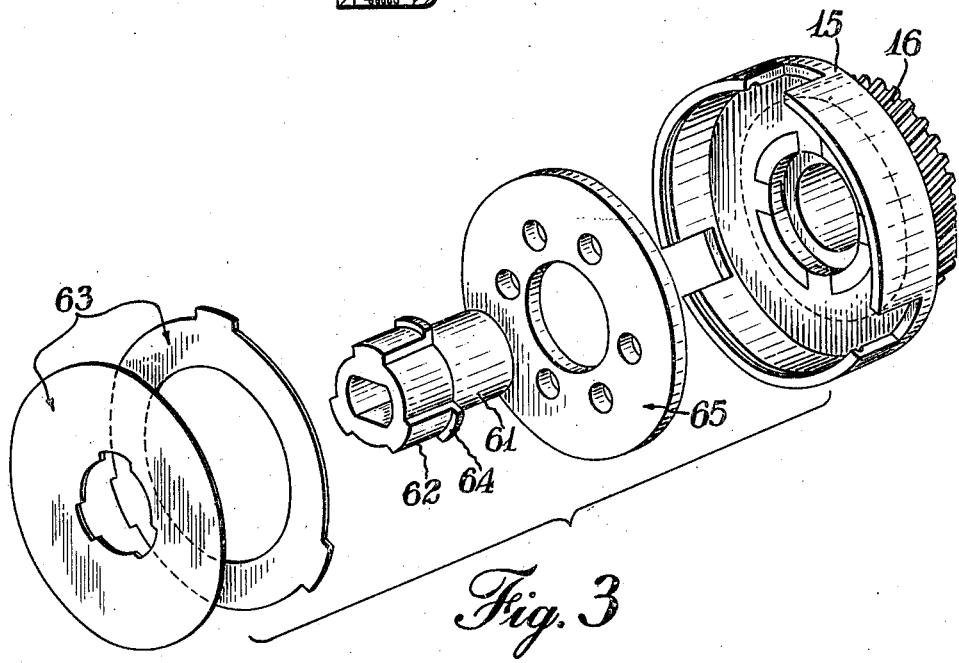
Witness:
Burr W. Jones
INVENTOR.
Maurice P. Whitney
BY Youston Sekella
ATTORNEY.

Patented Sept. 12, 1939

2,172,780

UNITED STATES PATENT OFFICE 2,172,780

VARIABLE SPEED TRANSMISSION

Maurice P. Whitney and Youston Sekella, Elmira, N. Y., assignors, by mesne assignments, to Bendix Aviation Corporation, South Bend, Ind., a corporation of Delaware Application January 3, 1938, Serial No. 183,098

11 Claims. (Cl. 74—369)

The present invention relates to variable speed transmissions and more particularly to a transmission having two speed ratios adaptable for use in connection with domestic washing and drying machines.

It is an object of the present invention to provide a novel variable speed gearing for washing machines and the like which is efficient, reliable and quiet in operation while being simple and economical in construction and adapted for easy and positive control.

It is another object to provide such a device which is so constructed and arranged that the thrusts set up between the various elements of the transmission are prevented from adversely affecting the control of the device.

Further objects and advantages will be apparent from the following description taken in connection with the accompanying drawings in which:

Fig. 2 is a sectional detail of a portion of the gearing including the high speed clutch of a modified form of the invention; and Fig. 3 is a detail in perspective of certain of the parts illustrated in Fig. 2, shown in disassembled relation.

Figure 1:
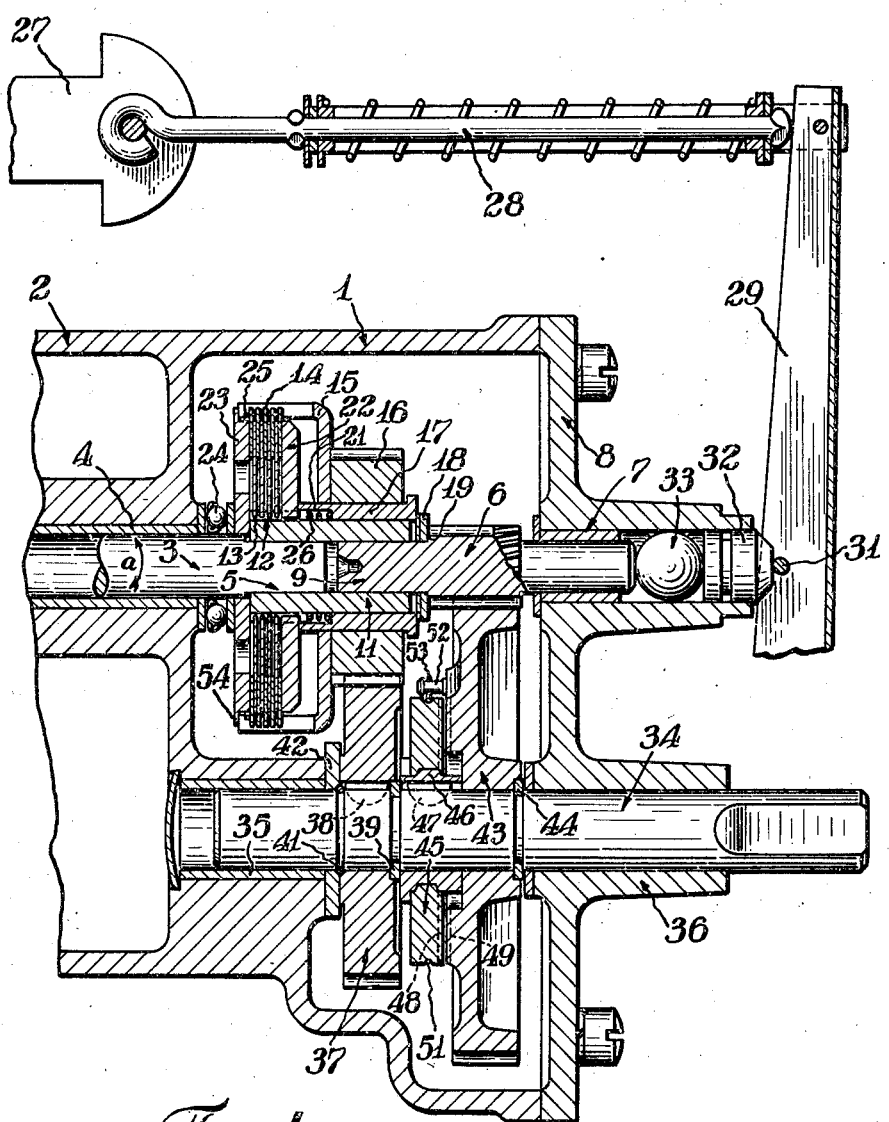
Fig. 1 is a longitudinal substantially mid-sectional view of a preferred embodiment of the invention.

In Fig. 1 of the drawings there is illustrated at 1 a casing which may, as indicated, be an extension of the casing of a driving motor indicated fragmentarily at 2. A drive shaft 3 is journalled in a bearing 4 in the motor casing and is provided with a portion 5 of non-circular contour extending into the casing 1. A low speed pinion member 6 is slidably journalled at 7 in the cover 8 of casing 1 in alignment with the drive shaft 3, and is provided with a non-cylindrical portion 9 extending adjacent the end of shaft 3. A sleeve 11 is slidably but non-rotatably mounted on the non-cylindrical extensions 5 and 9 and serves to slidably couple the pinion member 6 to the driving shaft.

The coupling sleeve 11 is provided at one end with longitudinal external splines 12, and a pack of friction clutch plates is mounted thereon including internally splined clutch plates 13 engaging said splines for rotation therewith. Externally splined clutch plates 14 are interleaved between the clutch plates 13 and are non-rotatably connected to a barrel 15 which is fixed in any suitable way to a high speed gear 16. A thrust bushing 17 is slidably journalled on the coupling sleeve 11 and serves as a journal for the high speed gear 16. The thrust bushing 17 is engaged at its outer end by a thrust washer 18 seated on the low speed pinion member 6 against a shoulder 19 formed at the base of the extension 9 thereof. The opposite end of the thrust bushing 17 is counterbored as indicated at 21 so as to extend over the splines 12 on the coupling sleeve 11 and bears against a pressure disc 22 splined on the coupling sleeve adjacent the clutch pack. A thrust plate 23 is mounted on the driving shaft 3 in position to close the open end of the barrel 15, and extends within the barrel sufficiently to bear against the clutch pack 13, 14. An anti-friction thrust bearing 24 is preferably provided for the thrust plate. The clutch discs are retained in the barrel by suitable means such as a split ring 25. Means are provided for normally relieving the pressure on the clutch pack in the form of a spring 26 located in the counterbore 21, and bearing against the ends of the splines 12 so as to urge the thrust bushing 17 away from the clutch pack.

Means are provided for closing the high speed clutch 13, 14 in the form of an actuating element 27 which may be the armature of a solenoid not further illustrated, and which is connected by a yieldingly extensible link 28 to a lever 29 fulcrumed in any suitable way on the casing 1 and provided with a pin 31 bearing on a cylindrical thrust block 32 slidably mounted in an extended portion of the bearing 7 for the pinion member 6. An anti-friction ball 33 is preferably interposed between the thrust block 32 and the end of the pinion member 6 whereby thrust pressures are transmitted from the block 32 to the pinion member 6 and from thence through the washer 18 and bushing 17 to the pressure disc 22 for the clutch.

A driven shaft 34 is journalled at 35 in the casing 1 and at 36 in the cover 8, in parallel relation to the driving shaft 3 and pinion member 6. A high speed gear 37 is keyed on the driven shaft in position to mesh with the driving gear 16 in any suitable manner as indicated at 38, and is restrained from longitudinal movement thereon by means of thrust rings 39 and 41 seated in grooves in the driven shaft. A thrust disc 42 is preferably interposed between the gear 37 and the end of the bearing 35.

A low speed gear 43 is journalled on the driven shaft in position to mesh with the pinion member 6, its position on the shaft being defined by suitable means such as a thrust ring 44.

An overrunning clutch connection is provided for driven shaft 34 from gear 43 comprising a clutch member 45 threaded on a sleeve 46 keyed as indicated at 47 on the driven shaft, said clutch member having a clutch face 48 arranged to engage a corresponding surface 49 on the gear 43 and to be forced into engagement therewith by the threaded connection with sleeve 46. Means for initiating the frictional engagement of the clutch member 45 and gear 43 is provided in the form of an elastic ring member 51 bearing frictionally on the periphery of the clutch member 45 and non-rotatably connected to the gear 43 as by means of a pin 52 engaging a terminal loop 53 of said ring.

In the operation of the device, and starting with the high speed clutch in relaxed condition, rotation of the driving shaft 3 by the motor is transmitted through the coupling sleeve 11 to the pinion member 6 which in turn rotates the low speed gear 43 whereby the friction ring 51 causes rotation of the clutch member 45 in a direction to thread it along the sleeve 46 into engagement with the gear 43 and clamp it to the driven shaft 34 which is thus rotated at low speed.

When it is desired to operate in high gear, it is merely necessary to apply tension to the control element 27 either manually or by means of a solenoid or other actuating device. The pin 31 in lever 29 is thus caused to apply pressure to the thrust block 32, which pressure is transmitted through the ball 33, pinion member 6, thrust washer 18 and thrust bushing 17 to the pressure disc 22 which compresses the clutch discs 13, 14 against the thrust plate 23. Rotation is then transmitted from the coupling sleeve 11 through the high speed clutch 13, 14 to the barrel 15 and high speed gear 16 which drives the high speed driven gear 37 and thus rotates the driven shaft 34 at high speed. This high speed rotation of the driven shaft causes the sleeve 46 to overrun the clutch member 45 whereby the clutch member backs away from and releases the gear 43.

When the tension member 27 is released, the high speed clutch 13, 14 is opened by the spring 26 so that the high speed connection is broken, whereupon the overruning clutch member 45 is caused to pick up and rotate the driven shaft 34 at low speed as previously described.

The low speed pinion member 6 is preferably provided with helical teeth as illustrated, the inclination of the teeth being such that when the driving shaft 3 is rotated in the direction of the arrow a, the endwise thrust on the pinion member is in a direction to release the high speed clutch.

The high speed gears 16, 37 are also preferably provided with helical teeth, the inclination thereof being such that when the load is being transmitted therethrough, the driving gear 16 is urged to the left as illustrated in Fig. 1. The thrust plate 23 is provided with a peripheral flange 54 overlying the end of the barrel 15 and arranged to transmit the thrust therefrom to the thrust bearing 24. The high speed clutch 13, 14 is thus completely unaffected by the longitudinal thrust of the gear 16.

It will be understood that the extensible link 28 is desirable more particularly in connection with solenoid operation of the device in that it permits seating of the armature of the solenoid irrespective of minor differences in dimensions and adjustment of the parts, thereby reducing the liability of hum or chatter in the solenoid when the alternating current type is used, and also conducing to more uniform application of pressure to the high speed clutch.

Figs. 2 and 3 illustrate an embodiment of the invention in which the high speed clutch operating structure is somewhat simplified by the omission of the thrust bushing 17, the function thereof being performed by the sleeve which couples the driving shaft 3 to the low speed pinion member 6.

As here shown, the coupling sleeve 61 corresponding to the sleeve 11 is provided with external splines 62 for engagement with the high speed clutch plates 63 in the same manner as the analogous parts in the first embodiment of the invention. Splines 62, however, are provided with terminal thrust shoulders 64, and pressure disc 65 is mounted on the ends of the splines 62 in engagement with shoulders 64 whereby longitudinal movement of sleeve 61 to the left causes pressure disc 65 to compress the clutch discs.

In this embodiment of the invention, the sleeve 61 extends into engagement with a thrust washer 68 seated against the shoulder 19 of the low speed pinion member 6 whereby longitudinal motion of the low speed pinion member causes the actuation of the sleeve 61 to control the high speed clutch.

Although but two embodiments of the invention have been shown and described in detail, it will be understood that other embodiments are possible and various changes may be made in the structure and arrangement of the parts without departing from the spirit of the invention as defined in the claims appended hereto.

What is claimed is:

1. In a variable speed transmission, a power shaft, a low speed driving pinion, a coupling sleeve slidably but non-rotatably connecting the pinion to the power shaft, a high speed drive gear rotatably mounted on the coupling sleeve, means including a friction clutch adapted to connect said drive gear to the coupling sleeve, means traversing said gear actuated by longitudinal movement of the pinion to control the clutch, and means for independently taking the end thrusts of the gear and clutch.

2. In a variable speed transmission, a power shaft, a low speed pinion member slidably coupled for rotation therewith, a high speed gear rotatably mounted concentric with the pinion member, means including a friction clutch for rotating said gear from the power shaft, and means to control the clutch including a thrust member mounted on and longitudinally movable by the pinion member and serving as a bearing for the gear.

3. In a variable speed transmission, a power shaft, a low speed pinion member, a sleeve slidably coupling the power shaft and pinion, a thrust bushing slidably journalled on the sleeve, a high speed drive gear slidably journalled on the thrust bushing, means including a friction clutch for transmitting rotation from the power shaft to the gear, and means transmitting longitudinal movement of the pinion through the thrust bushing to control the clutch.

4. In a variable speed transmission, a power shaft, a low speed pinion member, a sleeve slidably coupling the power shaft and pinion, a thrust bushing slidably journalled on the sleeve, a high speed helical drive gear slidably journalled on the thrust bushing, means including a friction clutch for transmitting rotation from the power shaft to the gear, means transmitting longitudinal movement of the pinion through the thrust bushing to control the clutch, and means for independently receiving the thrust of the clutch and of the gear.

5. In a variable speed transmission, a low speed pinion member, a helical drive gear rotatably mounted thereon, a driven shaft, a high speed helical driven gear fixed thereon meshing with the drive gear, a low speed driven gear loosely mounted on the driven shaft meshing with the drive pinion, an overrunning clutch connection between the low speed driven gear and its shaft, a friction clutch for connecting the drive gear to rotate with the pinion, means transmitting longitudinal movement of the pinion to control the clutch, means under the control of the operator for moving the pinion longitudinally to close the clutch, and thrust means receiving independently the longitudinal forces of the clutch and of the driving gear.

6. In a variable speed transmission, a power shaft, a low speed gear train therefrom including a pinion member slidably coupled thereto, a high speed gear train including a gear rotatably mounted on the pinion member and a friction clutch, and means traversing the gear actuated by longitudinal movement of the pinion to control the clutch.

7. In a variable speed transmission, a power shaft, a low speed gear train therefrom including a pinion member slidably coupled thereto, a driven shaft, a driven gear and an overrunning clutch connection therebetween, a high speed gear train including a rotatably mounted drive gear, a driven gear fixed to the driven shaft, and a clutch for connecting the drive gear to the power shaft; and means traversing the drive gear operable by longitudinal movement of the pinion member to control the clutch.

8. In a variable speed transmission, a power shaft, a low speed gear train therefrom including a pinion member slidably coupled thereto, a high speed gear train including a gear rotatably mounted on the pinion member and a friction clutch, a thrust member traversing the drive gear operable by longitudinal movement of the pinion member to control the clutch, yielding means urging the thrust member in a direction to release the clutch, and a thrust bearing forming an abutment for the clutch.

9. In a variable speed transmission, a power shaft, a low speed driving pinion member, a coupling member slidably but non-rotatably connecting the power shaft and pinion member, a thrust bushing journalled on the coupling member, a thrust washer in abutting relation with said bushing and pinion member, a high speed driving gear slidably journalled on the thrust bushing, means including a barrel member fixed to the high speed driving gear, and a fixed thrust bearing cooperating therewith for taking up end thrust on said gear, clutch discs alternately splined to the coupling member and barrel and retained against longitudinal movement by said thrust bearing, a pressure disc slidably mounted on said coupling member and actuated by the thrust bushing to compress the clutch discs, and means under the control of the operator for sliding the pinion member in a direction to close the clutch.

10. In a variable speed transmission, a power shaft, a low speed pinion member, a sleeve slidably coupling the power shaft and pinion, a high speed helical drive gear slidably journalled on the sleeve, means including a friction clutch for transmitting rotation from the power shaft to the gear, means transmitting longitudinal movement of the pinion through the sleeve to control the clutch, and means for independently receiving the thrust of the clutch and of the gear.

11. In a variable speed transmission, a power shaft, a low speed gear train therefrom including a pinion member, means for slidably coupling the pinion member to the power shaft, a high speed gear train including a gear rotatably mounted on the coupling means, and a friction clutch; means transmitting longitudinal movement of the pinion to control the clutch, and a thrust bearing for the gear forming an abutment for the clutch.

MAURICE P. WHITNEY.
YOUSTON SEKELLA.